United States Patent
Sheikh

(10) Patent No.: US 11,790,245 B2
(45) Date of Patent: Oct. 17, 2023

(54) COGNITIVE MACHINE LEARNING FOR SEMANTIC NETWORK

(71) Applicant: International Business Machines Corporation, Armonk, NY (US)

(72) Inventor: Khursheed Sheikh, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 16/253,437

(22) Filed: Jan. 22, 2019

(65) Prior Publication Data

US 2020/0234180 A1 Jul. 23, 2020

(51) Int. Cl.
*G06F 16/2458* (2019.01)
*G06N 5/02* (2023.01)

(52) U.S. Cl.
CPC ......... *G06N 5/02* (2013.01); *G06F 16/2458* (2019.01)

(58) Field of Classification Search
CPC .................................................. G06F 16/2458
See application file for complete search history.

(56) References Cited

U.S. PATENT DOCUMENTS

| | | | |
|---|---|---|---|
| 7,644,052 B1 | 1/2010 | Chang et al. | |
| 8,756,169 B2 | 6/2014 | Bowers et al. | |
| 9,443,192 B1* | 9/2016 | Cosic | G06N 3/006 |
| 9,910,914 B1 | 3/2018 | Cowley et al. | |
| 10,213,645 B1* | 2/2019 | Wu | G06K 9/6277 |
| 10,303,978 B1* | 5/2019 | Kang | G06F 16/3329 |
| 10,387,122 B1* | 8/2019 | Olsen | G06F 7/72 |
| 10,410,234 B1* | 9/2019 | Madden | G06Q 30/0222 |
| 10,528,576 B1* | 1/2020 | Wei | G06F 16/9535 |
| 10,552,541 B1* | 2/2020 | Dreher | G06N 5/02 |
| 2009/0016600 A1* | 1/2009 | Eaton | G06N 3/006 382/103 |
| 2013/0117210 A1* | 5/2013 | Hunzinger | G06N 3/082 706/25 |
| 2015/0142807 A1* | 5/2015 | Hofmann | G06N 3/02 707/759 |
| 2016/0162473 A1 | 6/2016 | Coglely et al. | |
| 2016/0217119 A1* | 7/2016 | Dakin | G06F 40/274 |

(Continued)

FOREIGN PATENT DOCUMENTS

WO WO2017147396 8/2017

OTHER PUBLICATIONS

P. Mell, et al. "The NIST Definition of Cloud Computing". NIST Special Publication 800-145, Sep. 2011, Gaithersburg, MD.

(Continued)

*Primary Examiner* — Vaishali Shah
(74) *Attorney, Agent, or Firm* — Eric Chesley; George S. Blasiak; Heslin Rothenberg Farley & Mesiti P.C.

(57) ABSTRACT

Methods, computer program products, and systems are presented. The methods include, for instance: generating a semantic network cell for a component of a semantic expression in a semantic network. The semantic network includes multiple semantic network cells. Each semantic network cell has attributes of a weight, an access count, and a latest time of access. A machine learning process reinforces the semantic network cell by access and deteriorates the semantic network cell over time based on semantic network cell weight rules, while the semantic network is servicing searches.

19 Claims, 9 Drawing Sheets

(56) References Cited

U.S. PATENT DOCUMENTS

| | | | |
|---|---|---|---|
| 2017/0277766 A1 | 9/2017 | Aasman et al. | |
| 2018/0039890 A1 | 2/2018 | Kim et al. | |
| 2019/0297456 A1* | 9/2019 | Rothschild | H04W 4/029 |
| 2020/0143227 A1* | 5/2020 | Tan | G06N 3/084 |
| 2022/0027740 A1* | 1/2022 | Dong | G06F 40/103 |

OTHER PUBLICATIONS

Global Dossier Report; U.S. Appl. No. 16/253,437; Jul. 28, 2023; 1 page.

Shen, Y., He, X., Gao, J., Deng, L., & Mesnil, G. (2014, April). Learning semantic representations using convolutional neural networks for web search. In Proceedings of the 23rd International Conference on World Wide Web (pp. 373-374). ACM.

Long, J., Shelhamer, E., & Darrell, T. (2015). Fully convolutional networks for semantic segmentation. In Proceedings of the IEEE conference on computer vision and pattern recognition (pp. 3431-3440).

* cited by examiner

500

```
        Semantic Query Format

L501:   Select  $(element_count)  number of element(s) from
        SemanticNetwork where  $(expression) is TRUE L510:   element_count
L511:              *
L512:              n (n > 0)
L513:   expression
L514:              term
L515:              term logical_op term
L516:              term logical_op expression
        . . .
```

| Weight Range | Time until W = 0.0 | Decay Factor (per hour) | Strength Factor (per access) |
|---|---|---|---|
| 0.001 – 0.999 | 1 day | -0.041666667 | 1 |
| 1.000 – 1.999 | 1 day | -0.041666667 | 0.1 |
| 2.000 – 2.999 | 3 days | -0.020833333 | 0.0667 |
| 3.000 – 3.999 | 2 weeks | -0.003787879 | 0.04 |
| 4.000 – 4.999 | 1 month | -0.002604167 | 0.02 |
| 5.000 – 5.999 | 2 months | -0.001388889 | 0.01 |
| 6.000 – 6.999 | 6 months | -0.000347222 | 0.002 |
| 7.000 – 7.999 | 1 year | -0.000225225 | 0.0005 |
| 8.000 – 8.999 | 3 years | -5.71E-05 | 0.0005 |
| 9.000 – 9.999 | 7 years | -2.85E-05 | 0.0002 |
| 10.000 | Infinite | 0.00 | 0.00 |

FIG. 6

COGNITIVE MACHINE LEARNING FOR SEMANTIC NETWORK

TECHNICAL FIELD

The present disclosure relates to artificial intelligence technology, and more particularly to methods, computer program products, and systems for cognitive machine learning process for semantic network.

BACKGROUND

Present machine learning techniques are typically based on a structured data model with paired data series, such as neural networks. Accordingly, conventional machine learning based on a neural network is to be implemented with a training set of a certain number of data instances that are respectively structured based on a data model of the neural network, and generating each training data instances takes resource. The conventional machine learning techniques based on the structured data model are often restricted to a specific and narrow range of use cases, even with the significantly sizable training data set for each use case.

SUMMARY

The shortcomings of the prior art are overcome, and additional advantages are provided, through the provision, in one aspect, of a method. The method includes, for instance: generating, by one or more processor, a semantic network cell that corresponds to a component of a semantic expression in a semantic network, where the semantic network includes a plurality of semantic network cells, and where each semantic network cell has attributes of a weight, an access count, and a latest time of access; and operating, by the one or more processor, the semantic network as a knowledgebase servicing searches by use of a machine learning process that emulates reinforcing of the semantic network cell by access and decaying of the semantic network cell over time by use of semantic network cell weight rules.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts an exemplary format of the query syntax for semantic queries to the semantic network, in accordance with one or more embodiments set forth herein;

FIG. 6 depicts an exemplary semantic network element weight rules, in accordance with one or more embodiments set forth herein;

DETAILED DESCRIPTION

Figure 1:
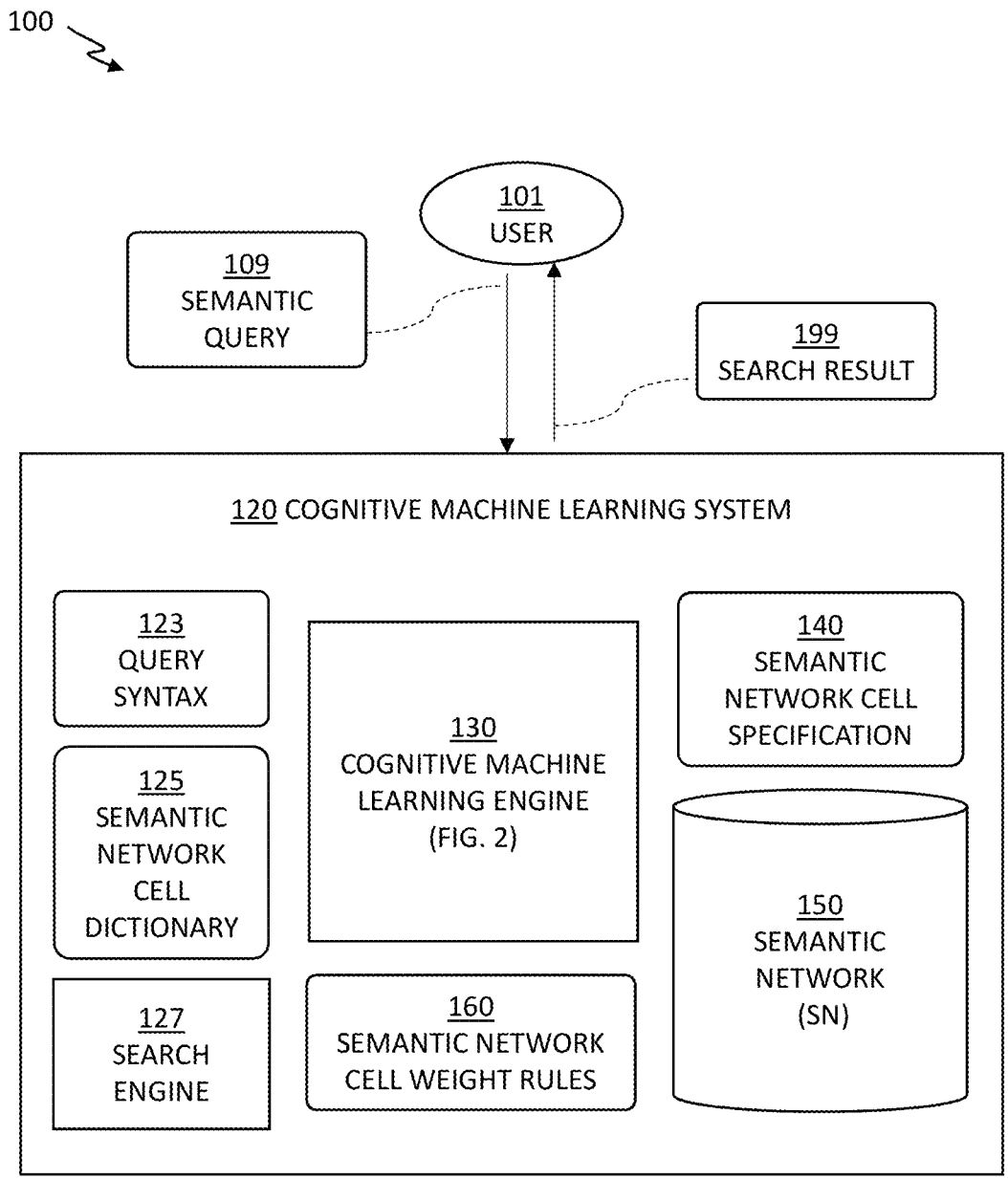
FIG. 1 depicts a system for cognitive machine learning in a semantic network, in accordance with one or more embodiments set forth herein.

FIG. 1 depicts a system 100 for cognitive machine learning for a semantic network 150, in accordance with one or more embodiments set forth herein.

The system 100 includes a cognitive machine learning system 120. The semantic network 150 of the cognitive machine learning system 120 is a knowledgebase that represents concepts of the semantic network 150 and semantic relations between the concepts of the semantic network 150. The semantic network 150 can be represented in a graph form, in which the concepts of the semantic network 150 are respectively represented as a node, and the semantic relations between the concepts are respectively represented by edges connecting the nodes of the semantic network 150. An exemplary semantic network 300 in a matrix format is presented in FIG. 3 and corresponding descriptions.

In this specification, term "semantic network cell" is used to indicate both the concepts represented by the nodes and the semantic relations represented by the edges of the semantic network 150. Each semantic network cell is represented as an entry in a multi-dimensional array, or any other data structure, that implements the semantic network 150. In certain embodiments of the present invention, each semantic network cell includes attributes of a weight, an access count, and the latest time of access, in addition to a description of either a concept or a semantic relation represented by the semantic network cell. Details on the semantic network cell representation as an entry of the implementing data structure are presented FIG. 3 and corresponding descriptions, based on an exemplary matrix form.

Embodiments of the present invention recognize that typical standard semantic networks are commonly represented in semantic triples, and each semantic triple is of a form <subject> <predicate> <object>. The semantic triples are well described in Resource Description Framework (RDF) data model authored by the World Wide Web Consortium (W3C). Embodiments of the present invention also recognize that the aforementioned semantic networks, as being represented in the semantic triples, are machine readable and that each component of a semantic triple, referred to as a resource, can be represented in respective resource identifiers, also known as the International Resource Identifier (IRI), such as the Uniform Resource Locators (URLs) for web resources. In this specification, a semantic triple is also referred to as a semantic expression.

Embodiments of the present invention also recognize that the semantic triple format supports more complex data models than traditional "entity-attribute-value" model within object-oriented design paradigm based on expansion of <subject> and/or <object> entities to respective semantic triples. In certain embodiments of the present invention, aforementioned characteristics of the semantic network data model and semantic triples are utilized as modified to emulate cases of memory loss and/or memory reinforcement in the semantic network 150. Embodiments of the present invention recognize that semantic networks are flexible that can service a very large number of use cases, as noted earlier, because semantic networks are devised to represent concepts of natural languages.

Embodiments of the present invention recognize that, however, conventional machine learning techniques are only applicable to highly ordered data structures with homogeneous key-value pair data and accordingly machine learning is not applicable for semantic networks representing a set of heterogeneous data with little to no constraints in data structure. Embodiments of the present invention recognize that conventional machine learning techniques utilizing neural networks cannot implement machine learning with semantic networks, as machine learning techniques based on neural network requires a large number of training data and can only service a narrowly specified use cases. Embodiments of the present invention recognize that conventional machine learning techniques utilizing neural networks do not include elements of weighted couplings and memory decay over time.

Certain embodiments of the present invention provide a machine learning technique based on semantic networks that emulates the processes of memory reinforcement and memory loss as in the case of human memory, in order to optimize composition of the semantic network 150 and to improve efficiency of searches against the semantic network 150.

The cognitive machine learning system 120 includes a query syntax 123, a semantic network cell dictionary 125, a search engine 127, a cognitive machine learning engine 130, a semantic network cell specification 140, the semantic network 150, and semantic network cell weight rules 160.

A user 101 communicates with the cognitive machine learning system 120 by submitting a semantic query 109 that seeks information from the semantic network 150 by specifying certain conditions. The conditions of the semantic query 109 can be both conceptual, by which seeks a certain information that meets the conceptual condition, and logistical, indicating that a certain information would be filtered according to conditions other than the conceptual condition, such as a weight, an access time, or an access count.

The cognitive machine learning system 120 generates a search result 199 based on instances of connected semantic network cells of the semantic network 150 that satisfy the conditions of the semantic query 109. The cognitive machine learning system 120 subsequently presents the search result 199 to the user 101.

The search engine 127 parses the semantic query 109 based on the query syntax 123, and determines the conditions of the semantic query 109. In certain embodiments of the present invention, the user 101 can present the semantic query 109 as authored according to the query syntax 123. In certain embodiments of the present invention, the cognitive machine learning system 120 is operatively coupled to a natural language processing (NLP) tools to process the semantic query 109 authored in a natural language as respective tokens specified in the query syntax 123. An example of the query syntax 123 for the semantic query 109 is presented in FIG. 5 and corresponding description.

The search engine 127 searches the semantic network 150 for the instances of connected semantic network cells that satisfies the conditions of the semantic query 109, as parsed according to the query syntax 123. The search engine 127 can activate a thread of the cognitive machine learning engine 130 for processing weights of the instances of the connected semantic network cells as discovered to meet the conditions of the semantic query 109.

The search engine 127 utilizes certain search filters based on respective attributes of the semantic network cells as proposed in the embodiments of the present invention. The search engine 127 prioritizes a search toward semantic network cells having greater weights, semantic network cells having higher access counts, semantic network cells with more recent values for the latest access time, and combinations thereof, in seeking the search result 199 based on the conditions of the semantic query 109. Particularly in order to validate the search filters as applied by the search engine 127, the semantic network cell weight rules 160 are devised to periodically reduce weights for all semantic network cells with an exception of semantic network cells with the maximum weight, representing fundamental concepts and facts of unforgettable memories. Accordingly, without being frequently accessed, any semantic network cells and pieces of information represented by the semantic network cells will be continuously weakened and eventually removed from the semantic network 150. As the search engine 127 applies search filters with more recent access time in forming the search result 199, the semantic network cells that have not been accessed for a long time would have less and less probability to have the weight increased, and the weight will eventually be reduced to zero (0) without any further access to recover from the periodic reduction on the weight as described herein.

The cognitive machine learning engine 130 adjusts respective weights of the instances of the connected semantic network cells that satisfies the semantic query 109 according to the semantic network cell weight rules 160. The cognitive machine learning engine 130 adjusts respective weights of all semantic network cells in the semantic network 150 periodically, for example, an hour, according to the semantic network weight rules 160. The semantic network cell weight rules 160 are devised to emulate memory loss over time and reinforcement of memory by repeated access. An exemplary set of the semantic network cell weight rules 160 is presented in FIG. 6 and corresponding description. The exemplary semantic network cell weight rules 160 of FIG. 6 is based on various theories of memory functions, including that a memory is strengthened if often reminded and repeatedly used, that a memory is weakened over time without being recollected, that a memory can be completely forgotten by the same weakening effect over a long period of time, and that a certain very powerful memory would not be weakened over time at all.

Figure 3:
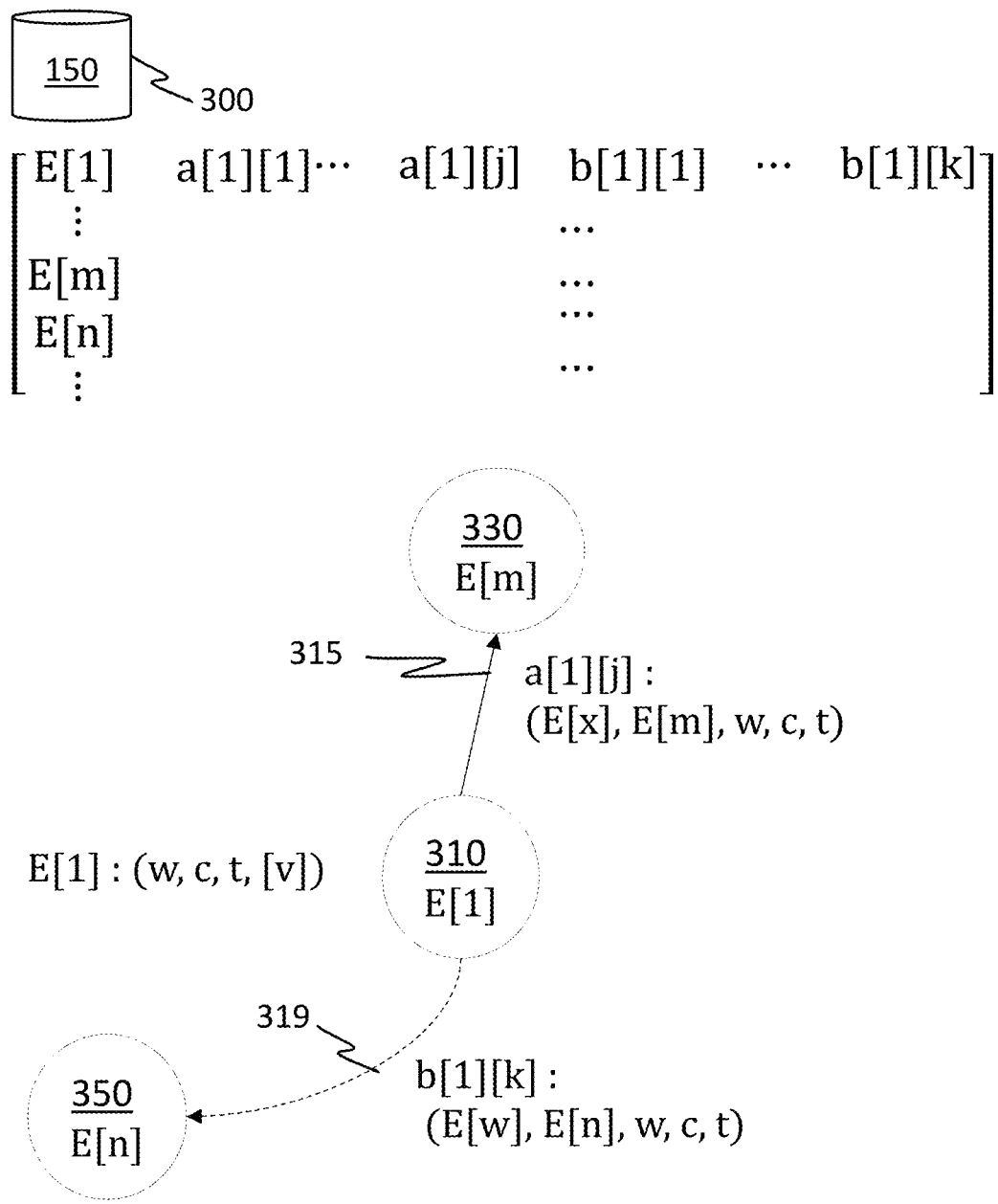
FIG. 3 depicts an exemplary semantic network based on the semantic network cell specification, in accordance with one or more embodiments set forth herein.

The semantic network cell specification 140 describes a format in which individual cells of the semantic network 150 are presented. As noted, the cells of the semantic network 150, referred to as the semantic network cells, can be either a concept or a semantic relation. Exemplary specifications for concepts and semantic relations are shown in FIG. 3 and corresponding descriptions; and an exemplary set of semantic network cells of the semantic network 150 that forms the search result 199 is presented in FIG. 4 and corresponding description.

The semantic network cell dictionary 125 is a list of human-readable strings respectively corresponding to keys in the semantic network 150. The keys in the semantic network 150 include, but are not limited to, concepts, semantic relations, attributes of concepts, and attributes of semantic relations. Accordingly, the search engine 127 can utilize the semantic network cell dictionary 125 in converting certain portion of the instances of connected semantic network cells discovered from the semantic network 150 to render the search result 199 in order to make the search result 199 readable for the user 101. In certain embodiments of the present invention, the search engine 127 can include items for keys, or identifiers to the keys corresponding to the semantic network cells as discovered from the semantic network 150 in the search result 199 for the user 101, and a user device for the user 101 decrypts, expands, converts, or otherwise replaces items with the strings in the semantic network cell dictionary 125 upon presenting the search result 199 to the user 101.

Figure 2:
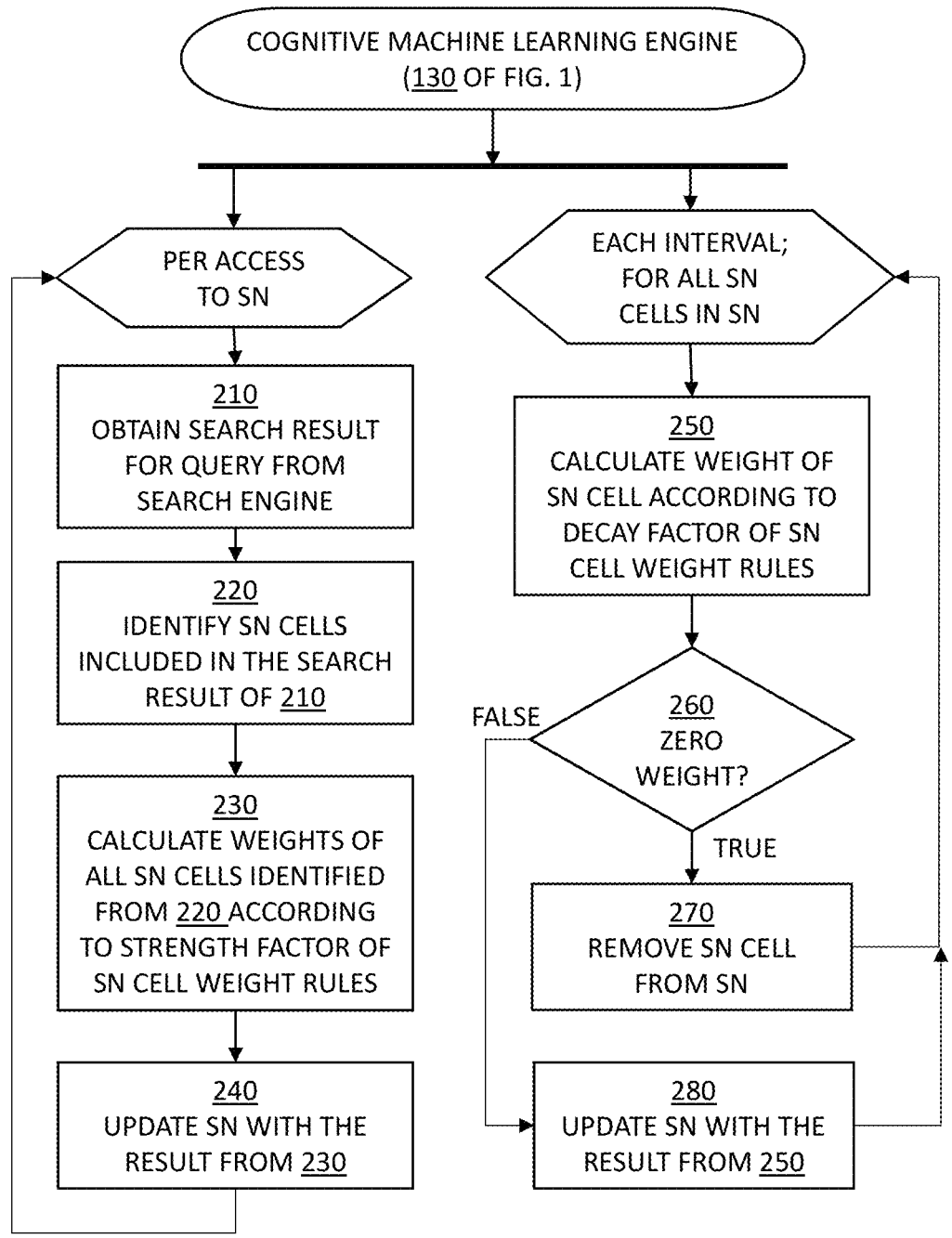
FIG. 2 depicts a flowchart of operations performed by the cognitive machine learning engine, in accordance with one or more embodiments set forth herein.

FIG. 2 depicts a flowchart of operations performed by the cognitive machine learning engine, in accordance with one or more embodiments set forth herein.

The unit of blocks 210 through 240 represents a process of reinforcing a memory, as represented by a group of selected semantic network cells, for an access. The unit of blocks 250 through 280 represents a process of memory decay that occurs every predefined period to all semantic network cells in the semantic network 150. Accordingly, the unit of blocks 210 through 240 and the unit of blocks 250 through 280 run concurrently and independently from the other unit in separate threads.

As noted, the cognitive machine learning engine 130 runs blocks 210, 220, 230, and 240 as a unit in order to strengthen a group of selected semantic network cells for each access to the semantic network 150, in order to strengthen the semantic network cells that service the semantic query 109 and participate in the search result 199. By strengthening only truthful semantic network cell connections over time, the cognitive machine learning engine 130 will be able to keep the semantic network 150 with only useful information as represented by the often reinforced semantic network cell connections.

Prior to block 210, the search engine 127 execute the semantic query 109 against the semantic network 150. If any group of semantic network cells in the semantic network 150 meets the conditions of the semantic query 109, the search engine 127 forwards the search result 199 to the cognitive machine learning engine 130 to update the semantic network 150 with the search result 199. The semantic network cells forming the search result 199 are connected with one another, as establishing a piece of information responding to the semantic query 109. The cognitive machine learning engine 127, in combination with the search engine 127, can connect previously disconnected semantic network cells to represent a new piece of information in the semantic network 150, which had been discovered from data mining of other resources or provided as an input from the user 101. In the embodiments specified in FIG. 2, the cognitive machine learning engine 130 obtains the search result 199 from the search engine 127 as a connected set of semantic network cells representing a complete response to the semantic query 109.

In block 210, the cognitive machine learning engine 130 obtains the search result 199 for the search query 109 from the search engine 127. Then, the cognitive machine learning engine 130 proceeds with block 220.

In block 220, the cognitive machine learning engine 130 identifies semantic network cells participating in the search result 109 obtained in block 210. As noted, all semantic network cells in the search result 109 are connected, indicating a certain semantic relationship amongst all semantic network cells of the search result 109. Then, the cognitive machine learning engine 130 proceeds with block 230.

In block 230, the cognitive machine learning engine 130 calculates respective weights of all semantic network cells identified from block 220, according to strength factors of the semantic network cell weight rules 160. Then, the cognitive machine learning engine 130 proceeds with block 240.

As noted, the semantic network cell weight rules 160 are devised to emulate how a certain memory is reinforced by repeated access. In certain embodiments of the present invention, the strength factors are differentiated respective to various ranges of weights of the semantic network cells, to emulate that a fresh and weak memory is reinforced in a much higher rate than an old and strong memory.

In block 240, the cognitive machine learning engine 130 updates the semantic network 150 with the semantic network cells with respective weights as calculated in block 230. Then, the cognitive machine learning engine 130 loops back to block 210 for the next cycle of search on the semantic network 150.

As noted, the cognitive machine learning engine 130 runs blocks 250, 260, and either 270 or 280 based on the decision made in block 260, as another unit for every predetermined interval to weaken or to remove all semantic network cells in the semantic network 160. The unit of blocks 250 through 280 intends to keep the number of semantic network cells in the semantic network 150 at a certain level without keeping semantic network cells that are rarely or never used for servicing the semantic query 109 and participating in the search result 199, by emulating memory loss as in the human memory process.

In block 250, the cognitive machine learning engine 130 calculates a weight of a current semantic network cell according to a decay factor of the semantic network cell weight rules 160 that is applicable for the current semantic network cell. Then, the cognitive machine learning engine 130 proceeds with block 260.

In certain embodiments of the present invention, decay factors of the semantic network cell weight rules 160 are a set of negative numbers indicating the quantity reduced from the current weight of the current semantic network cell. The decay factors of the semantic network cell weight rules 160 are differentiated dependent upon a range of the current weight value, in order to make a semantic network cell with a greater weight deteriorate slower and another semantic network cell with a less weight deteriorate more rapidly. An example of a set of scaled decay factors in the semantic network cell weight rules 160 are presented in FIG. 6 and corresponding description.

In block 260, the cognitive machine learning engine 130 determines whether or not the weight of the current semantic network cell is zero (0), as calculated from block 250. As noted, in the embodiments of the present invention, the weight value of zero (0) for the semantic network cell indicates that the concept represented by the semantic network cell is forgotten over time, and that the semantic network cell should be removed from the semantic network 150. If the cognitive machine learning engine 130 determines that the weight of the current semantic network cell is zero (0), which indicates that the piece of information represented by the current semantic network cell has been forgotten over time for a lack of access, then, the cognitive machine learning engine 130 proceeds with block 270. If the cognitive machine learning engine 130 determines that the weight of the current semantic network cell is not zero as adjusted from block 250, then, the cognitive machine learning engine 130 proceeds with block 280.

In block 270, the cognitive machine learning engine 130 removes the current semantic network cell from the semantic network 150. Then, the cognitive machine learning engine 130 loops back to block 250 for a next semantic network cell in the same decay cycle.

In block 280, the cognitive machine learning engine 130 updates the semantic network 150 with the current semantic network cell with the weight calculated from block 250, which is non-zero. Then, the cognitive machine learning engine 130 loops back to block 250 for the next cycle.

In certain embodiments of the present invention, the cognitive machine learning engine 130 performs multiple threads of the unit of blocks 250 through 280 by parallel processing, such that respective weights of all semantic network cells can be updated. In certain embodiments of the present invention, the search engine 127 checks the latest access time of the semantic network cell during search when encountered with the semantic network cell for satisfying the conditions of the semantic query 109, and calculates a new weight based on the value of the current weight, the latest access time, and the values of the decay factors applicable for the current weight value, in order to apply any weight-based filter. The periodic deterioration according to the semantic network cell weight rules 150 can be implemented in many ways.

FIG. 3 depicts an exemplary semantic network 300 based on the semantic network cell specification 140, in accordance with one or more embodiments set forth herein.

The exemplary semantic network 300 is an instance of the semantic network 150 of FIG. 1. The exemplary semantic network 300 is represented in a matrix format, which is a two-dimensional array. As noted, the exemplary semantic network 300 is a knowledgebase that represents concepts and semantic relations between the concepts. Also as noted, in a graph form corresponding to the exemplary semantic network 300, the concepts of the exemplary semantic network 300 are respectively represented as a node, and the semantic relations between the concepts are respectively represented by edges connecting the nodes. Each entry in the matrix of the exemplary semantic network 300 represents a semantic network cell.

Each row in the matrix of the exemplary semantic network 300 includes E semantic network cell representing a concept, one or more a semantic network cell representing semantic relation from E concept, and one or more b semantic network cell representing reverse semantic relation from E concept. In the first row of E[1], a[1][1], . . . , a[1][j], b[1][1], . . . , b[1][k] in the exemplary semantic network 300, E[1] represents a first concept node, a[1][1], . . . , a[1][j] represents j number of semantic relation edges from the first concept node E[1] in order of 1 to j, where j is a positive integer, and b[1][1], . . . , b[1][k] represents k number of reverse semantic relation edges from the first concept node E[1] in order of 1 to k, where k is a positive integer. E[m] in the m-th row and E[n] in the n-th row of the matrix of the exemplary semantic network 300 represent respective concepts.

In the graph equivalent to the matrix of the exemplary semantic network 300, three concept nodes E[1] 310, E[m] 330, and E[n] 350, respectively corresponding to rows E[1], E[m], and E[n] are presented. A j-th semantic relation edge from node E[1] in the matrix of the exemplary semantic network 300 is represented as a[1][j] solid edge 315. Similarly, a k-th reverse semantic relation edge from node E[1] in the matrix of the exemplary semantic network 300 is represented as b[1][k] dashed edge 319.

The distinction between a semantic relation and a reverse semantic relation depends on which concept is a subject between two connected nodes and which concept is an object. In the context of semantic triple in the aforementioned form <subject> <predicate> <object>, the <predicate> would indicate a semantic relation, and a reverse semantic relation would be represented with <object> <reverse predicate> <subject>. The reverse semantic relation is introduced to optimize searches for a subject concept by using an object concept, because an object concept can be easily located by searching with a subject concept using the semantic relation, but without the reverse semantic relation, searching the subject concept by the object concept would be less efficient.

As noted, each semantic network cell has respective attributes. The first concept node E[1] 310 represents a concept uniquely associated with the node and has attributes (w, c, t, [v]), where w indicates a weight of the concept node E[1] 310, c indicates an access count of the first concept node E[1] 310, t indicates the latest access time to the first concept node E[1] 310, and [v] indicates a vector for the property value of the first concept node E[1] 310. In the matrix of the exemplary semantic network 300, the attributes (w, c, t, [v]) of the first concept node E[1] 310 are represented as a vector indexed by E[1], that is, (E[1].w, E[1].c, E[1].t, E[1].[v]). Similarly, concept nodes E[m] 330 and E[n] 350 are respectively represented with attribute vectors. Exemplary instances of the concept node are presented in FIG. 4 and corresponding description.

The semantic relation edge a[1][j] 315 and the reverse semantic relation edge b[1][k] 319 are represented in the row of E[1] 310. Accordingly, the semantic relation edge a[1][j] 315 and the reverse semantic relation edge b[1][k] 319 can also be represented as vectors in the row of E[1] 310, as in E[1].a[1][j] and E[1].b[1][k], respectively.

The a[1][j] 315, representing the j-th semantic relation edge from the concept node E[1] 310 has attributes (E[x], E[m], w, c, t), where E[x] indicates the meaning of the semantic relation edge a[1][j] 315 as represented by a concept node E[x], E[m] indicates a concept node to which the semantic relation edge a[1][j] 315 connecting with the first concept node E[1] 310, w indicates a weight of the semantic relation edge a[1][j] 315, c indicates an access count of the semantic relation edge a[1][j] 315, and t indicates the latest access time to the semantic relation edge a[1][j] 315. In the matrix of the exemplary semantic network 300, the attributes (E[x], E[m], w, c, t) of the semantic relation edge a[1][j] 315 are represented as a vector indexed by a[1][j], that is, (a[1][j].E[x], a[1][j].E[m], a[1][j].w, a[1][j].c, a[1][j].t). An exemplary instance of the semantic relation edge is presented in FIG. 4 and corresponding description.

Similarly, the b[1][k] 319, representing the k-th reverse semantic relation edge from the concept node E[1] 310 has attributes (E[w], E[n], w, c, t), where E[w] indicates the meaning of the reverse semantic relation edge b[1][k] 319 as represented by a concept node E[w], E[n] indicates a concept node to which the reverse semantic relation edge b[1][k] 319 connecting with the first concept node E[1] 310, w indicates a weight of the reverse semantic relation edge b[1][k] 319, c indicates an access count of the reverse semantic relation edge b[1][k] 319, and t indicates the latest access time to the reverse semantic relation edge b[1][k] 319. In the matrix of the exemplary semantic network 300, the attributes (E[w], E[n], w, c, t) of the reverse semantic relation edge b[1][k] 319 are represented as a vector indexed by b[1][k], that is, (b[1][k].E[w], b[1][k].E[n], b[1][k].w, b[1][k].c, b[1][k].t). An exemplary instance of the reverse semantic relation edge is presented in FIG. 4 and corresponding description.

Figure 4:
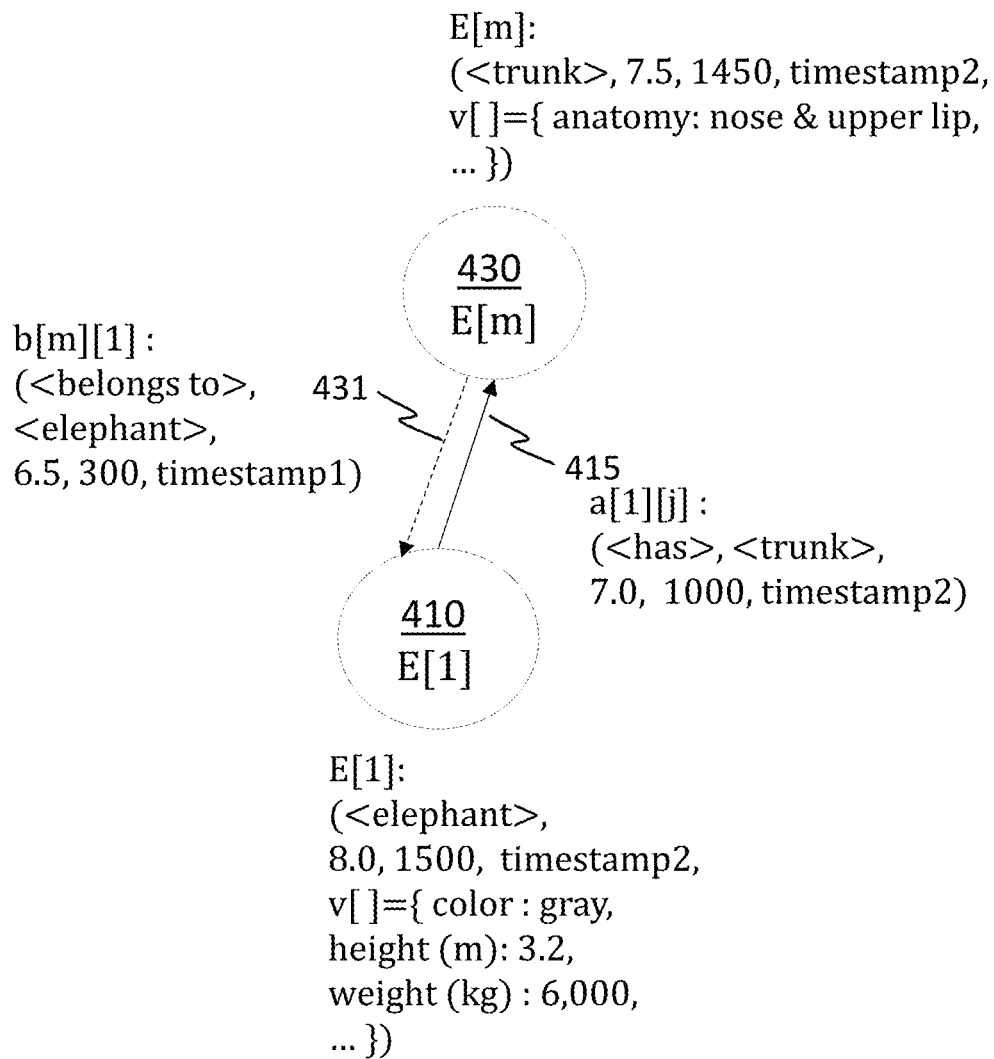
FIG. 4 depicts instantiated cells of the exemplary semantic network of FIG. 3 in combination with content in the semantic network cell dictionary, in accordance with one or more embodiments set forth herein.

FIG. 4 depicts instantiated cells of the exemplary semantic network 300 of FIG. 3 in combination with content in the semantic network cell dictionary 125, in accordance with one or more embodiments set forth herein.

A concept node E[1] 410 represents exemplary instances for attributes of the first concept node E[1] 310 of FIG. 3. The concept node E[1] 410 represents a concept <elephant>, which is listed in the semantic network cell dictionary 125 as an entry "E[1]: elephant". The weight of the concept node E[1] 410 is 8.0, that is, E[1].w=8.0. The access count of the concept node E[1] 410 is 1500, that is, E[1].c=1500. The latest access time to the concept node E[1] 410 is a time stamp value represented by timestamp2, that is, E[1].t=timestamp2. The vector of property values of the concept node E[1] 410 is represented as E[1].v[ ]={color: gray, height (m): 3.2, weight (kg): 6,000, . . . }. The vector of property values of the concept node E[1] 410 lists a series of key-value pairs for the concept <elephant> represented in concept node E[1] 410.

Another concept node E[m] 430 represents a concept <trunk>, having the weight of 7.5, the access count of 1450, and the latest access time to concept <trunk> is timestamp2, which is equal to the latest access time of the concept node E[1].t=timestamp2 as previously noted.

A semantic relation edge a[1][j] 415 is coming out of the concept node E[1] 410<elephant>, has a meaning <has>, and points to the concept node E[m] 430<trunk>. Accordingly, the connected semantic relation cells of E[1] 410, a[1][j] 415, and E[m] 430 represent a piece of information <elephant> <has> <trunk>. The weight of the semantic relation edge a[1][j] 415 is 7.0, the access count of the semantic relation edge a[1][j] 415 is 1000, and the latest access time to the semantic relation edge a[1][j] 415 is timestamp2, which is equal to the both latest access time to the concepts nodes of E[1] 410<elephant> and E[m] 430<trunk>.

A reverse semantic relation edge b[j][1] 431 is coming out of the concept node E[m] 430<trunk>, has a meaning <belongs to>, and points to the concept node E[1] 410<elephant>. Accordingly, the connected semantic relation cells of E[m] 430, b[j][1] 431, and E[1] 410 represent a piece of information <trunk> <belongs to> <elephant>. The weight of the reverse semantic relation edge b[j][1] 431 is 6.5, the access count of the reverse semantic relation edge b[j][1] 431 is 300. The latest access time to the reverse semantic relation edge b[j][1] 431 is timestamp1, representing a timestamp older than timestamp2, which implicates that the information <trunk> <belongs to> <elephant> in the semantic network 150 had been accessed before the information <elephant> <has> <trunk> in the semantic network 150.

FIG. 5 depicts an exemplary format of the query syntax 500 for semantic queries to the semantic network 150, in accordance with one or more embodiments set forth herein.

Line L501 is a condition requested in the semantic query 109, which looks for $(element_count) number of elements that satisfies $(expression), where $(element_count) and $(expression) are specified in the exemplary semantic query format 500.

Lines L510 through L512 specify how to interpret the variable $(element_count), which can be a random number, as indicated by "*" in L511, or a positive integer, as indicated by "n (n>0)" in L512.

Lines L513 through L516 specify how to parse the variable $(expression), which can be a single term, as indicated by "term" in L514, or a result of a logical operation between two terms, as indicated by "term logical_op term" in L515, or a result of a logical operation between a term and an expression, as indicated by "term logical_op expression" in L516. Embodiments of the present invention recognizes that expanding the second term in a semantic triple <subject> <predicate> <object> is a common practice in semantic representation.

FIG. 6 depicts an exemplary semantic network element weight rules 600, in accordance with one or more embodiments set forth herein.

As noted in block 230 of FIG. 2, the cognitive machine learning engine 130 calculates the weight of a semantic network cell per access to reinforce the information represented by the semantic network cell, according to the strength factor applicable for the semantic network cell. Also the cognitive machine learning engine 130 calculates the weight of all semantic network cell for every preconfigured interval to deteriorate the information represented by the semantic network cell, according to the decay factor applicable for the semantic network cell, in block 250 of FIG. 2.

The exemplary semantic network element weight rules 600 is an example of the semantic network element weight rules 160. The exemplary semantic network element weight rules 600 includes four (4) columns of Weight range, Time until W=0.0, Decay factor, and Strength factor.

In each row, the weight range column indicate a value of a current weight of the semantic network cell to calculate the weight in either block 230 or block 250. If the cognitive machine learning engine 130 accessed the exemplary semantic network element weight rules 600 from block 230 to strengthen the weight of the semantic network cell, then, the cognitive machine learning engine 130 adds a value in the Strength factor column in the row of the current weight to the current weight of the semantic network cell, that is cell.w=cell.w+StrengthFactor[cell.w].

If the cognitive machine learning engine 130 accessed the exemplary semantic network element weight rules 600 from block 250 to weaken the weight of the semantic network cell, then, the cognitive machine learning engine 130 adds a value in the Decay factor column in the row of the current weight to the current weight of the semantic network cell, that is cell.w=cell.w+DecayFactor[cell.w], where all values in the Decay factor column are negative values. As a result, the cognitive machine learning engine 130 reduces the weight of the semantic network cell by the configured amount in the Decay factor column.

The values in the exemplary semantic network element weight rules 600 represent: that the memory represented in the semantic network cells deteriorate at different rates according to current weights; that the memory represented in the semantic network cells with greater weights deteriorate slower than the information represented in the semantic network cells with less weights, indicating that the memory would take longer time to be forgotten, that is, to be removed from the semantic network; that the stronger the memory is, as represented by the weight of the semantic network cells, each additional access has less strengthening effect on the memory; and that a certain very strong memory, as represented in the row of Weight Range=10, would not deteriorate over time at all.

In certain embodiments of the present invention, the semantic network element weight rules 160 specifies another factor of Emotional State in order to amplify the Strength factor and to set the weight of the memory at a much higher level than normal strengthening, based on the cognitive state of a person according to the circumstances of the information represented by the semantic network cell, in order to emulate human memory process even more closely. It is well known that a certain memorable or historical event, public or individual, can strengthen memories of the same day or for a close time period so much that people would remember the entire day as it was yesterday for decades. The Emotional State factor would be applicable very rarely, but will emulate human memory process much better under applicable circumstances as noted above. In the same embodiment of the present invention, the cognitive machine learning engine 130 adds a value in the Strength factor column multiplied by the Emotional State factor in the row of the current weight to the current weight of the semantic network cell, that is cell.w=cell.w+StrengthFactor[cell.w]*ESF, where ESF represents a value of the Emotional State factor applicable for the current adjustment, for strengthening the semantic network cell.

Certain embodiments of the present invention has technical advantage of enabling machine learning in semantic networks by emulating human memory process. Certain embodiments of the present invention offers differentiated levels of memory reinforcement and memory deterioration according to a current weight of a semantic network cell representing a certain memory. Certain embodiments of the present invention implements an improved search strategy against the semantic network so trained by the machine learning. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The cognitive machine learning tool and/or the semantic network can provide services for subscribed business entities and individual users in need from any location in the world.

Figure 7:
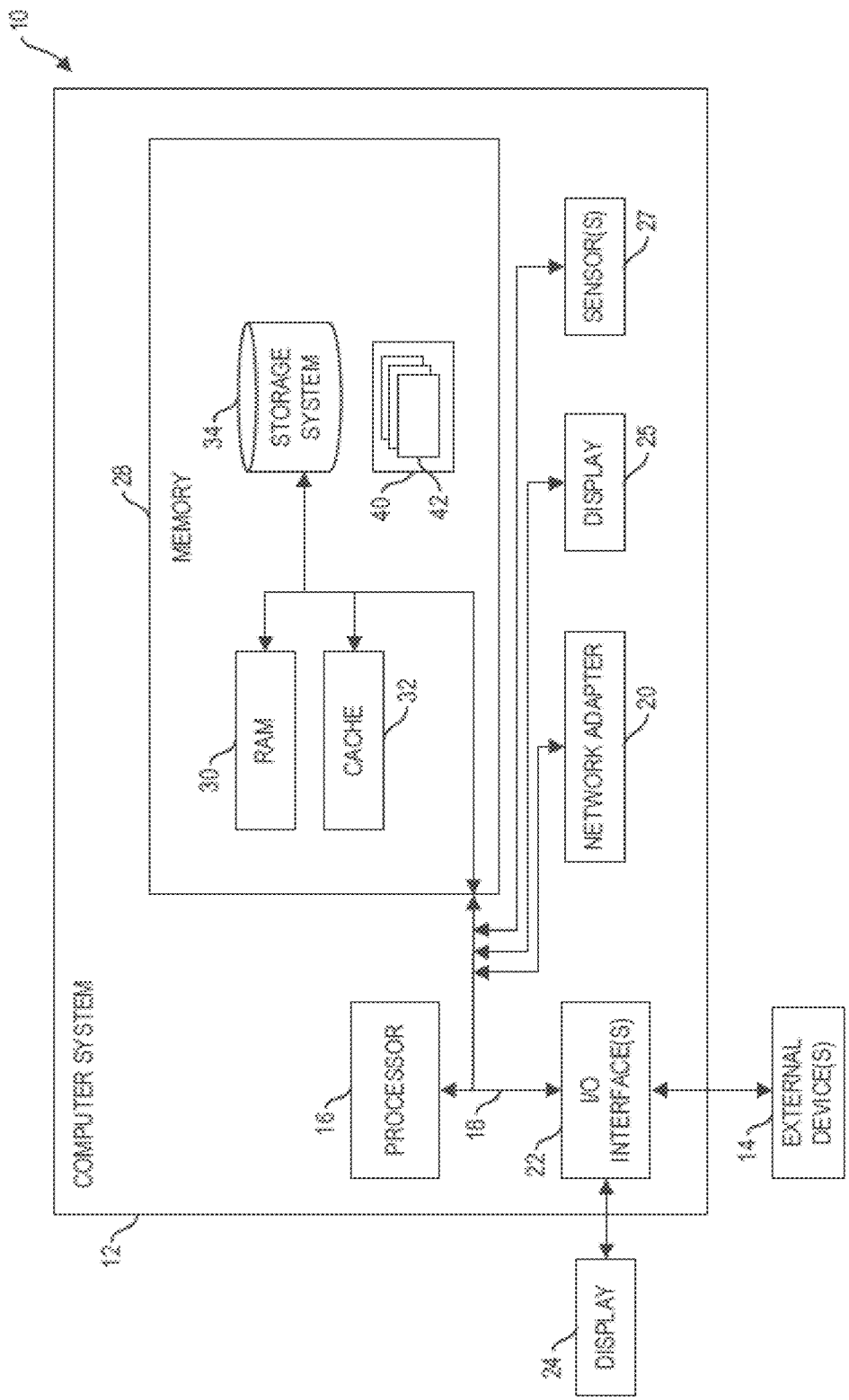
FIG. 7 depicts a cloud computing node according to an embodiment of the present invention.
Figure 8:
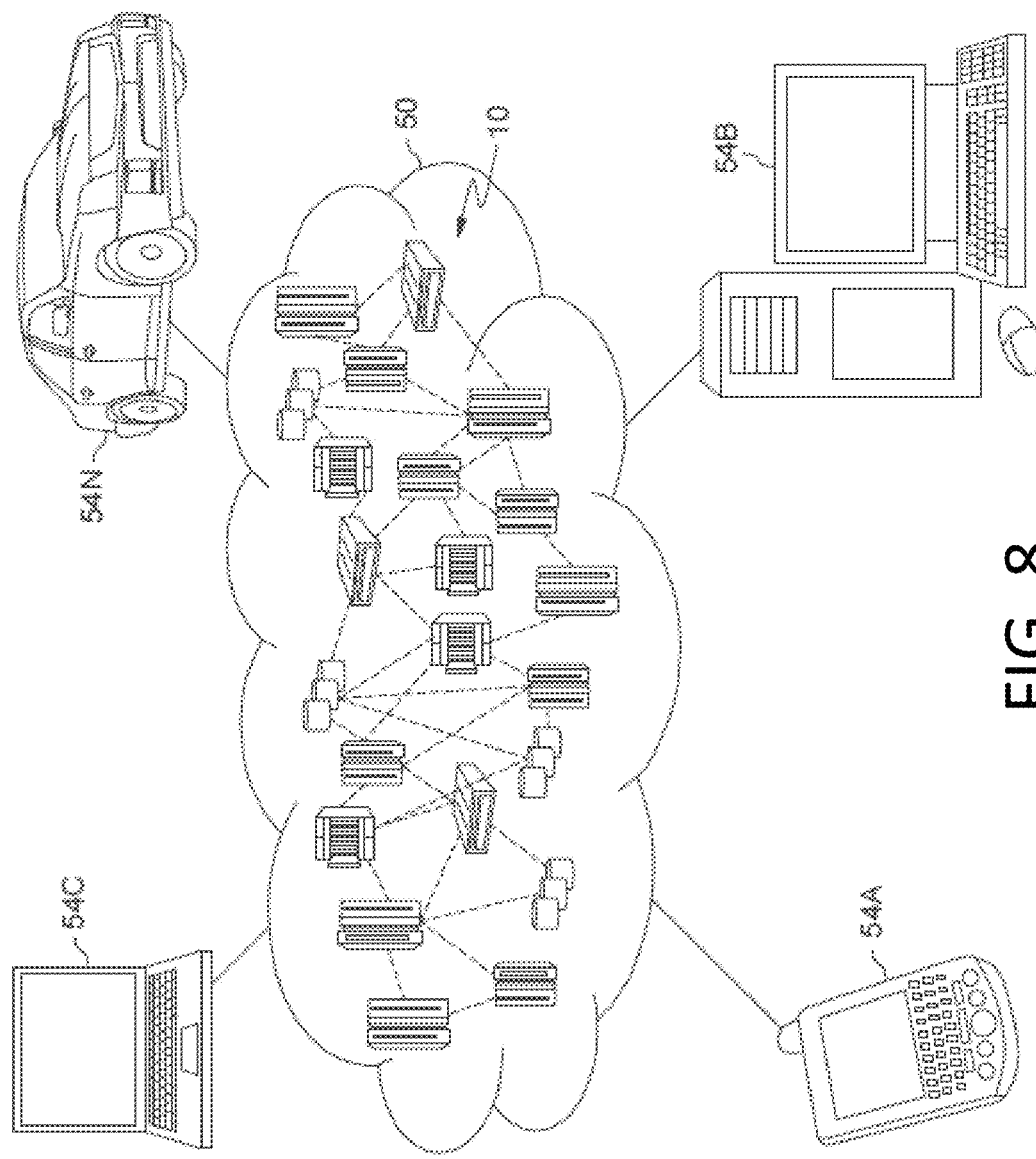
FIG. 8 depicts a cloud computing environment according to an embodiment of the present invention.
Figure 9:
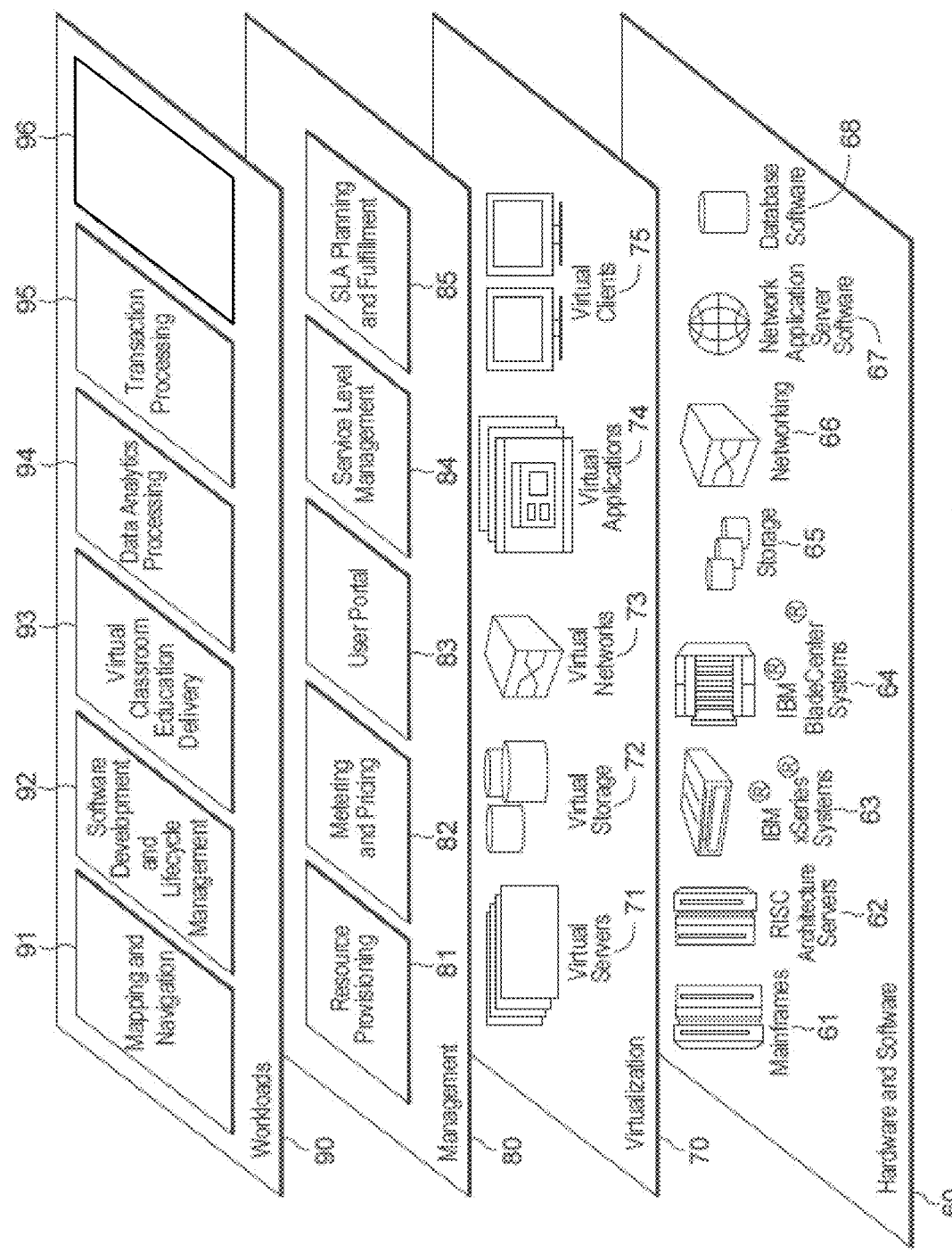
FIG. 9 depicts abstraction model layers according to an embodiment of the present invention.

FIGS. 7-9 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive machine learning engine 130 and the cognitive machine learning system 120 of FIG. 1, respectively. Program processes 42, as in the cognitive machine learning engine 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive machine learning system including the semantic network 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer program product comprising:
a computer readable storage medium readable by one or more processor and storing instructions for execution by the one or more processor for performing a method comprising:
generating a semantic network cell that corresponds to a component of a semantic expression in a semantic network, wherein the semantic network includes a plurality of semantic network cells, and wherein each semantic network cell has attributes of a weight, an access count, and a latest time of access;
operating the semantic network as a knowledgebase servicing searches in dependence on a machine learning process that emulates reinforcing of the semantic network cell by access and decaying of the semantic network cell over time in dependence on semantic network cell weight rules, wherein the operating includes obtaining search results for iterations of semantic queries of the semantic network received from a search engine, and identifying semantic network cells of the semantic network that are accessed as a result of respective iterations of semantic queries, wherein the accessed semantic network cells that are accessed as a result of the respective iterations of semantic queries satisfy conditions of the respective iterations of the semantic queries; and
strengthening weights of the identified semantic network cells of the semantic network that are accessed as a result of the respective iterations of semantic queries in dependence on strength factors of the semantic network cell weight rules, wherein the strengthening is in dependence on the access count, and latest time of access attributes of respective ones of the identified semantic network cells that are accessed as a result of the respective iterations of semantic queries.

2. The computer program product of claim 1, wherein the attributes of the semantic network cell are to implement search filters while searching the semantic network,
wherein a kind of the semantic network cell is selected from the group consisting of: concept and a semantic relation, wherein attributes of the semantic network cell representing a concept further include a description of the concept and a list of key-value pairs, and wherein the attributes of the semantic network cell representing a semantic relation further include a description of the semantic relation from one semantic network cell to another semantic network cell, representing respective concepts.

3. The computer program product of claim 1, the operating comprising:
obtaining a search result against the semantic network that satisfies conditions of a query;
identifying one or more semantic network cells participating in the search result from the obtaining;
calculating the weight for each of the one or more semantic network cells according to a strength factor corresponding to a current weight of the semantic network cell in the semantic network cell weight rules; and
updating the semantic network with the semantic network cell with the weight from the calculating.

4. The computer program product of claim 1, wherein the method includes iteratively decaying all semantic network cells of the plurality of semantic network cells so that the semantic network cells of the plurality of semantic network cells that are not accessed as a result of the iterations of semantic queries have reduced weights relative to weights of the identified semantic network cells of the semantic network that are subject to strengthening as a result of being accessed.

5. The computer program product of claim 1, wherein the method includes removing from the semantic network semantic network cells having weights that have decayed to zero weight as a result of not being accessed over a period of time.

6. A computer implemented method comprising:
generating a semantic network cell that corresponds to a component of a semantic expression in a semantic network, wherein the semantic network includes a plurality of semantic network cells, and wherein each semantic network cell has attributes of a weight, an access count, and a latest time of access;
operating the semantic network as a knowledgebase servicing searches in dependence on a machine learning process that emulates reinforcing of the semantic network cell by access and decaying of the semantic network cell over time in dependence on semantic network cell weight rules, wherein the operating includes obtaining search results for iterations of semantic queries of the semantic network received from a search engine, and identifying semantic network cells of the semantic network that are accessed as a result of respective iterations of semantic queries, wherein the accessed semantic network cells that are accessed as a result of the respective iterations of semantic queries satisfy conditions of the respective iterations of the semantic queries; and strengthening weights of the identified semantic network cells of the semantic network that are accessed as a result of the respective iterations of semantic queries in dependence on strength factors of the semantic network cell weight rules, wherein the strengthening is in dependence on the access count, and latest time of access attributes of respective ones of the identified semantic network cells that are accessed as a result of the respective iterations of semantic queries.

7. The computer implemented method of claim 6, wherein the attributes of the semantic network cell are to implement search filters while searching the semantic network,
wherein a kind of the semantic network cell is selected from the group consisting of: concept and a semantic relation, wherein attributes of the semantic network cell representing a concept further include a description of the concept and a list of key-value pairs, and wherein attributes of the semantic network cell representing a semantic relation further include a description of the semantic relation from one semantic network cell to another semantic network cell, representing respective concepts.

8. The computer implemented method of claim 6, the operating comprising:
obtaining a search result against the semantic network that satisfies conditions of a query;
identifying one or more semantic network cells participating in the search result from the obtaining;
calculating a weight for each of the one or more semantic network cells according to a strength factor corresponding to a current weight of the semantic network cell in the semantic network cell weight rules; and
updating the semantic network with the semantic network cell with the weight from the calculating.

9. The computer implemented method of claim 6, the operating comprising:
ascertaining a period time predefined for decaying the plurality of semantic network cells in the semantic network had lapsed; and
calculating a weight for each of the plurality of semantic network cells according to a decay factor corresponding to a current weight of a current semantic network cell in the semantic network cell weight rules.

10. The computer implemented method of claim 9, further comprising:
ascertaining that the weight of the current semantic network cell from the calculating is greater than zero (0); and
updating the semantic network with the current semantic network cell with the weight from the calculating.

11. The computer implemented method of claim 9, further comprising:
ascertaining that the weight of the current semantic network cell from the calculating is equal to zero (0); and
removing the current semantic network cell from the semantic network.

12. The computer implemented method of claim 6, wherein the values of the semantic network cell weight rules implement to decrease weights of greater values slower than the weights of less values over the same period of time, to increase the weights of greater values slower than the weights of less values over the same number of accesses, and to represent a certain concept that does not deteriorate at all over time with a maximum weight.

13. A system comprising:

a memory;

one or more processor in communication with the memory;

program instructions executable by the one or more processor via the memory to perform a method comprising:

generating a semantic network cell that corresponds to a component of a semantic expression in a semantic network, wherein the semantic network includes a plurality of semantic network cells, and wherein each semantic network cell has attributes of a weight, an access count, and a latest time of access;

operating the semantic network as a knowledgebase servicing searches in dependence on a machine learning process that emulates reinforcing of the semantic network cell by access and decaying of the semantic network cell over time in dependence on semantic network cell weight rules, wherein the operating includes obtaining search results for iterations of semantic queries of the semantic network received from a search engine, and identifying semantic network cells of the semantic network that are accessed as a result of respective iterations of semantic queries, wherein the accessed semantic network cells that are accessed as a result of the respective iterations of semantic queries satisfy conditions of the respective iterations of the semantic queries; and strengthening weights of the identified semantic network cells of the semantic network that are accessed as a result of the respective iterations of semantic queries in dependence on strength factors of the semantic network cell weight rules, wherein the strengthening is in dependence on the access count, and latest time of access attributes of respective ones of the identified semantic network cells that are accessed as a result of the respective iterations of semantic queries.

14. The system of claim 13, wherein the attributes of the semantic network cell are to implement search filters while searching the semantic network, wherein a kind of the semantic network cell is selected from the group consisting of: concept and a semantic relation, wherein attributes of the semantic network cell representing a concept further include a description of the concept and a list of key-value pairs, wherein attributes of the semantic network cell representing a semantic relation further include a description of the semantic relation from one semantic network cell to another semantic network cell, representing respective concepts, and wherein the values of the semantic network cell weight rules implement to decrease weights of greater values slower than the weights of less values over the same period of time, to increase the weights of greater values slower than the weights of less values over the same number of accesses, and to represent a certain concept that does not deteriorate at all over time with a maximum weight.

15. The system of claim 13, the operating comprising:

obtaining a search result against the semantic network that satisfies conditions of a query;

identifying one or more semantic network cells participating in the search result from the obtaining;

calculating the weight for each of the one or more semantic network cells according to a strength factor corresponding to a current weight of the semantic network cell in the semantic network cell weight rules; and updating the semantic network with the semantic network cell with the weight from the calculating.

16. The system of claim 13, the operating comprising:

ascertaining a period time predefined for decaying the plurality of semantic network cells in the semantic network had lapsed; and calculating the weight for each of the plurality of semantic network cells according to a decay factor corresponding to a current weight of a current semantic network cell in the semantic network cell weight rules.

17. The system of claim 16, further comprising:

ascertaining that the weight of the current semantic network cell from the calculating is greater than zero (0); and updating the semantic network with the current semantic network cell with the weight from the calculating.

18. The system of claim 16, further comprising:

ascertaining that the weight of the current semantic network cell from the calculating is equal to zero (0); and removing the current semantic network cell from the semantic network.

19. The system of claim 13, wherein the semantic network is included in a cognitive machine learning system that includes a semantic network cell dictionary, wherein the semantic network cell dictionary includes a list of human-readable strings respectively corresponding to keys in the semantic network, and wherein the keys in the semantic network include concepts, semantic relations, attributes of concepts, and attributes of semantic relations.

* * * * *